United States Patent [19]

Loew et al.

[11] 4,113,718
[45] Sep. 12, 1978

[54] BASIC AZO DYES

[75] Inventors: Peter Loew, Munchenstein; Stefan Koller, Ramlinsburg, both of Switzerland

[73] Assignee: Ciba-Geigy Corporation, Ardsley, N.Y.

[21] Appl. No.: 676,599

[22] Filed: Apr. 13, 1976

[30] Foreign Application Priority Data

Apr. 29, 1975 [CH] Switzerland .......................... 5527/75
Apr. 29, 1975 [CH] Switzerland .......................... 5526/75

[51] Int. Cl.$^2$ .................. C09B 43/00; C09B 29/36
[52] U.S. Cl. .................................. 260/147; 260/155; 260/156; 260/158; 260/162
[58] Field of Search ..................... 260/158, 146 R, 147

[56] References Cited

U.S. PATENT DOCUMENTS 2,913,303  11/1959  Baumann et al. ................. 260/158 X
3,829,418  8/1974  Raue et al. ....................... 260/158 X

FOREIGN PATENT DOCUMENTS 232,623  3/1964  Austria ...................................... 260/158

Primary Examiner—Charles F. Warren
Attorney, Agent, or Firm—Edward McC. Roberts; Michael W. Glynn; Prabodh I. Almaula

[57] ABSTRACT

A cationic azo dye of the formula

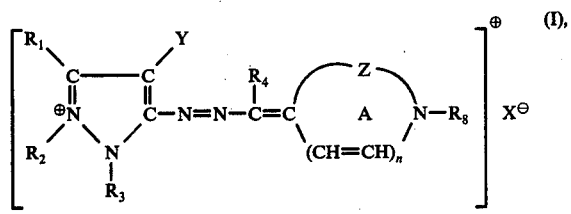

wherein $n$ is 0 or 1, Z represents a divalent radical which completes the ring A to form a 5- or 6-membered ring which can carry a fused and substituted or unsubstituted benzene ring and contain nitrogen, oxygen and/or sulphur atoms as ring atoms, Y represents a substituted or unsubstituted alkyl or aryl radical or preferably a hydrogen atom, $X^\ominus$ represents an anion, $R_1$ represents a substituted or unsubstituted alkyl or aryl radical, $R_2$ represents a substituted or unsubstituted alkyl or benzyl radical, $R_3$ represents a substituted or unsubstituted alkyl, aralkyl or aryl radical, $R_4$ represents a group of the formulae —CN, —CONR$_5$R$_6$ and —COOR$_7$, wherein $R_5$ and $R_6$ represent hydrogen atoms or substituted or unsubstituted alkyl, aralkyl or aryl radicals, and $R_7$ represents a substituted or unsubstituted alkyl or aryl radical, and $R_8$ represents a substituted or unsubstituted alkyl or benzyl radical. The new dyestuffs dye polyacrylonitrile fibers in fast yellow shades.

1 Claim, No Drawings

BASIC AZO DYES

The present invention provides cationic dyes of the formula

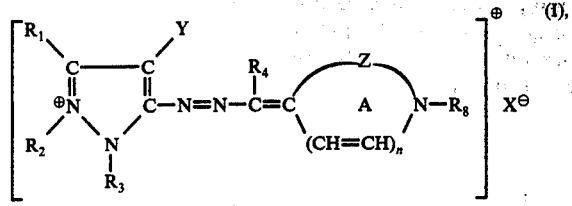

wherein $n$ is 0 or 1, Z represents a divalent radical which completes the ring A to form a 5- or 6-membered ring which can carry a fused and substituted or unsubstituted benzene ring and contain nitrogen, oxygen and/or sulphur atoms as ring atoms, Y represents a substituted or unsubstituted alkyl or aryl radical or preferably a hydrogen atom, $X^{\ominus}$ represents an anion, $R_1$ represents a substituted or unsubstituted alkyl or aryl radical, $R_2$ represents a substituted or unsubstituted alkyl or benzyl radical, $R_3$ represents a substituted or unsubstituted alkyl, aralkyl or aryl radical, $R_4$ represents a group of the formulae —CN, —CONR$_5$R$_6$ and —COOR$_7$, wherein $R_5$ and $R_6$ represent hydrogen atoms or substituted or unsubstituted alkyl, aralkyl or aryl radicals, and $R_7$ represents a substituted or unsubstituted alkyl or aryl radical, and $R_8$ represents a substituted or unsubstituted alkyl or benzyl radical.

The dyes of the present invention are obtained by quaternising compounds of the formula

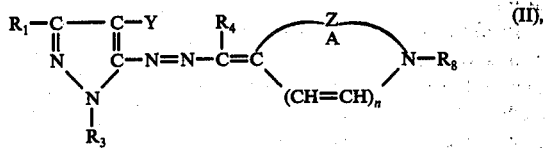

wherein $R_1$, $R_3$, $R_4$, $R_8$, Y, Z and $n$ are as defined hereinabove and $R_8$ can also be hydrogen, with alkylating agents.

Useful dyes are those of the formula (I), wherein $n$ is 0 or 1, Z represents a divalent radical which completes the ring A to form a 5- or 6-membered ring which can carry a fused and substituted or unsubstituted benzene ring and contain nitrogen, oxygen and/or sulphur atoms as ring atoms, $X^{\ominus}$ is an anion, and each of Y and $R_1$ independently represents a substituted or unsubstituted alkyl or aryl radical, $R_2$ represents a substituted or unsubstituted alkyl or benzyl radical, $R_3$ represents a substituted or unsubstituted alkyl, aralkyl or aryl radical, $R_4$ represents a group of the formulae —CN, —COOR$_5$R$_6$ and —COOR$_7$, wherein $R_5$ and $R_6$ represent hydrogen atoms or substituted or unsubstituted alkyl, aralkyl or aryl radicals and $R_7$ represents a substituted or unsubstituted alkyl or aryl radical, and $R_8$ represents a substituted or unsubstituted alkyl, alkenyl or benzyl radical.

Particularly preferred dyes are those of the formula

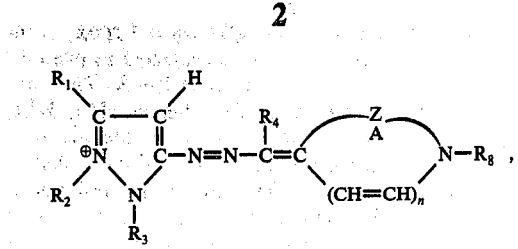

wherein $R_1$, $R_2$, $R_3$, $R_4$, $R_8$, $n$ and Z are as defined hereinbefore.

The alkyl radicals represented by R are preferably lower alkyl radicals. Throughout this specification the terms "low molecular" and "lower" denote radicals containing 1 to 4 carbon atoms.

Possible substituents of the radicals $R_1$, $R_2$, $R_3$, $R_4$, $R_5$, $R_6$, $R_7$ and $R_8$ are, when these latter represent alkyl groups, non-ionogenic substituents, i.e. substituents which do not form any ions in aqueous medium, such as bromine and chlorine atoms, lower alkoxy groups (e.g. methoxy, ethoxy, butoxy groups), phenyl, hydroxy, cyano, carboxy amide, N-lower alkyl carboxy amide, N,N-di-lower alkyl carboxy amide and lower alkoxy carbonyl groups.

The anion $X^{\ominus}$ can be derived from strong inorganic acids and then represents, for example, the chlorine, bromine, iodine, nitrate, sulphate, in particular hydrogen sulphate and phosphate, in particular dihydrogenphosphate, ion. Anions of organic acids are, however, also possible, by which are meant arylsulphonate, alkylsulphonate, arylcarbonate and alkylcarbonate ions, in particular the benzenesulphonate ion and its derivatives which are substituted by nitro, chlorine, bromine, alkyl and alkoxy groups, each of 1 to 4 carbon atoms, alkylsulphonate ions of 1 to 4 carbon atoms, anions of aliphatic carboxylic acids containing 1 to 4 carbon atoms and benzoates the benzene ring of which can carry the same substituents as the benzenesulphonate ion. The anions of low molecular alkylsulphuric acid half esters (i.e. which contain 1 to 4 carbon atoms) are particularly important. In addition, the dyes can be in the form of double salts with heavy metal halides, especially with zinc and cadmium halides, or of complexes.

Examples of such anions are the benzenesulphonate, p-toluenesulphonate, p-methoxybenzenesulphonate, methanesulphonate, ethanesulphonate, formiate, acetate, chloroacetate, propionate, lactate, tartrate, benzoate, methylbenzoate, methylsulphate, ethylsulphate, $ZnCl_3{}^{\ominus}$, $BF_4{}^{\ominus}$, $CdCl_3{}^{-}$ and $PF_6{}^{\ominus}$ complex ion.

Suitable alkylating agents with which the azo compounds of the formula (II) are reacted to give cycloammonium salts of the formula (I) are, for example, the following compounds of the formula R—X: substituted or unsubstituted low molecular alkyl esters or aralkyl esters of a hydrogen halide, for example the methyl, ethyl, n-propyl, β-cyanoethyl, allyl, methallyl, propinyl, β-carbamoylethyl or benzyl ester of hydrogen chloride, hydrogen bromide or hydrogen iodide, low molecular dialkyl sulphates, such as dimethyl or diethyl sulphate, substituted or unsubstituted alkyl esters of 1 to 4 carbon atoms of an organic sulphonic acid, for example the methyl, β-chloroethyl, ethyl, propyl and butyl ester of benzenesulphonic acid, o- or p-toluenesulphonic acid, 4-chlorobenzenesulphonic acid or 4-nitrobenzenesulphonic acid, and the bromoacetic or chloroacetic alkyl esters which contain 1 to 4 carbon atoms in the alkyl moiety.

Further alkylating agents are alkenes and epoxy compounds. These compounds can be regarded as primary products of alkanol esters of the type R—X. They are reacted in the presence of acids, such as HCl, HBr, formic acid or glacial acetic acid, with the nitrogen compounds to be quaternised. Examples of such alkylating agents are the reagents listed in the first column of the following table, which introduce the respective radical $R_2$, listed in the second column, into the nitrogen compound:

| | $R_2$ |
|---|---|
| $CH_2=CH-CN$ | $-CH_2-CH_2-CN$ |
| $CH_2=CH-COOCH_3$ | $-CH_2-CH_2-COOCH_3$ |
| $CH_2=CH-COOC_2H_5$ | $-CH_2-CH_2-COOC_2H_5$ |
| $CH_2-CH_2$ (epoxide) | $-CH_2-CH_2-OH$ |
| $CH_2-CH-CH_3$ (epoxide) | $-CH_2-CH-CH_3$ <br> $\quad\quad\quad$ OH |
| $CH_2-CH-CH_2Cl$ (epoxide) | $-CH_2-CH-CH_2Cl$ <br> $\quad\quad\quad$ OH |

The alkylation is advantageously performed by heating in an inert organic solvent, for example a hydrocarbon, such as benzene, toluene or xylene, a halogenated hydrocarbon, such as carbon tetrachloride, tetrachloroethane, chlorobenzene, o-dichlorobenzene, or a nitrated hydrocarbon, such as nitromethane, nitrobenzene or nitronaphthalene. Acid anhydrides, acid amides or nitriles, such as acetic anhydride, dimethyl formamide or acetonitrile, or dimethyl sulphoxide, can also be used as solvents in the alkylation. Instead of using a solvent, it is also possible to use a substantial excess of alkylating agent. In order to initiate the reaction it is mostly necessary — particularly in the presence of organic solvents — to heat the reaction mixture externally. In some instances it is also possible to carry out the alkylation in aqueous medium or with an alcohol, if appropriate in the presence of small amounts of potassium iodide.

Particularly preferred dyes are those of the formula

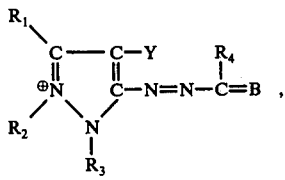

wherein $R_1$ represents methyl, ethyl, propyl or butyl, which can carry as substituents hydroxy, methoxy, ethoxy, propoxy, butoxy, carbomethoxy, carboethoxy, carbopropoxy or carbobutoxy, chlorine, bromine, cyano, acetoxy, propionoxy, chloroacetoxy, butyryloxy, or phenyl which is unsubstituted or substituted by chlorine, bromine, fluorine, methyl, ethyl, propyl, butyl, methoxy, ethoxy, propoxy, butoxy, aminosulphonyl, methylated or ethylated aminosulphonyl, carbomethoxy, carboethoxy or carbopropoxy or aminocarbonyl, $R_2$ represents an alkyl radical of 1 to 6 carbon atoms which can be substituted by chlorine, bromine, cyano, hydroxy, alkoxy of 1 to 4 carbon atoms, alkoxycarbonyl or 1 to 4 carbon atoms, alkylcarbonyloxy of 1 to 4 carbon atoms, or represents an alkenyl or alkinyl radical of 3 to 5 carbon atoms which can be substituted by chlorine, or represents a benzyl group, $R_3$ represents methyl, ethyl, propyl or butyl which can carry as substituents hydroxy, methoxy, ethoxy, propoxy, butoxy, carbomethoxy, carboethoxy, carbopropoxy or carbobutoxy, chlorine, bromine, cyano, acetoxy, propionoxy, chloroacetoxy, butyryloxy, or represents phenyl which is unsubstituted or substituted by chlorine, bromine, fluorine, methyl, ethyl, propyl, butyl, methoxy, ethoxy, propoxy, butoxy, aminosulphonyl, methylated or ethylated aminosulphonyl, carbomethoxy, carboethoxy, carbopropoxy or aminocarbonyl, or also represents benzyl, nitrobenzyl, methoxybenzyl, methylbenzyl, ethoxybenzyl, chlorobenzyl or phenylethyl, $R_4$ represents

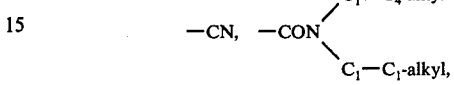

$CONH_2$, $-CO-NH-C_1-C_4$-alkyl, $CO-O-C_1-C_4$-alkyl, or $-CO-O-C_6-C_8$-alkyl, Y represents a substituted or unsubstituted alkyl or aryl radical or preferably hydrogen, and B represents the radical of the formula

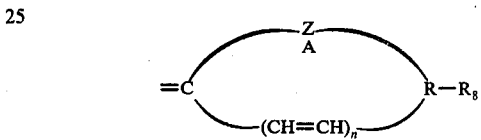

wherein Z represents a divalent radical which completes the ring A to form a 5- or 6-membered ring which can carry a fused and substituted or unsubstituted benzene ring and contain nitrogen, oxygen and/or sulphur atoms as ring atoms, $n$ is 1 or 2 and $R_8$ represents an alkyl radical of 1 to 6 carbon atoms which can be substituted by chlorine, bromine, cyano, hydroxy, alkoxy of 1 to 4 carbon atoms, alkylcarbonyloxy of 1 to 4 carbon atoms.

Preferably $R_2$ is an alkyl radical of 1 to 6 carbon atoms which can be substituted by chlorine, bromine, cyano, hydroxy, alkoxy of 1 to 4 carbon atoms, alkoxycarbonyl of 1 to 4 carbon atoms, alkylcarbonyloxy of 1 to 4 carbon atoms, or represents a benzyl group.

The radical B is derived preferably from imidazoles, benzimidazoles, benzoxazoles, benzthiazoles, indolines, pyridines and 1,2-dihydroquinolines, which can be substituted by alkyl of 1 to 4 carbon atoms, chlorine, bromine, nitro, cyano, carboalkoxy of 1 to 4 carbon atoms, aminosulphonyl, or alkoxy of 1 to 4 carbon atoms.

The compounds of the formula (II) are obtained in the usual way by diazotising an aminopyrazole and coupling with a compound of the formula (III)

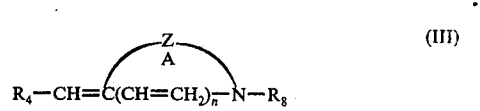
(III)

which, when $R_8$ = H, can also have the tautomeric formula

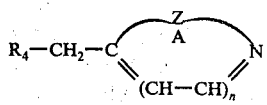

Examples of suitable diazo components are:

5-amino-3,4-dimethylpyrazole,
5-amino-3,4-dimethyl-1-phenylpyrazole,
5-amino-3-methyl-4-phenylpyrazole,
5-amino-3-methyl-1,4-diphenylpyrazole,
5-amino-3-ethyl-4-methyl-1-phenylpyrazole,
5-amino-4-ethyl-3-methylpyrazole,
5-amino-4-ethyl-3-methyl-1-phenylpyrazole,
5-amino-1-[(4'-nitro, 3'-methoxy-, 3'-chloro-, 4'-methyl-, 3'-methyl-, 4'-chloro- or -3'-methylsulphonyl)-phenyl]-3,4-dimethyl pyrazole;

and preferred diazo components are 5-amino-3-methylpyrazole,
5-amino-1-ethyl-3-methylpyrazole,
5-amino-1,3-dimethylpyrazole,
5-amino-3-methyl-1-phenylpyrazole,
5-amino-3-phenylpyrazole,
5-amino-1-methyl-3-phenylpyrazole,
5-amino-1,3-diphenylpyrazole,
5-amino-3-methyl-1-p-chlorophenylpyrazole,
5-amino-1-cyclohexyl-3-methylpyrazole,
5-amino-1-isopropyl-3-methylpyrazole,
5-amino-1-ethyl-3-methylpyrazole,
5-amino-1-[(4'-nitro-, 3'-methoxy-, 3'-chloro-, 4'-methyl-, 3'-methyl-, 4'-chloro- or 3'-methylsulphonyl)-phenyl]-3-methylpyrazole.

Examples of further suitable coupling components are:

benzimidazolyl acetonitrile,
methylbenzimidazolyl acetonitrile,
chlorobenzimidazolyl acetonitrile,
benzimidazolyl ethyl acetate,
benzimidazolyl methyl acetate,
benzimidazolyl diethylacetamide,
2-cyano-methylene-1,3-dimethyl-benzimidazole,
benzoxazolyl acetonitrile,
methylbenzoxazolyl acetonitrile,
chlorobenzoxazolyl acetonitrile,
benzoxazolyl methyl acetate,
benzoxazolyl ethyl acetate,
benzoxazolyl dibutyl acetamide,
2-cyanomethylene-3-methyl-benzoxazole,
benzthiazolyl acetonitrile,
methylbenzthiazolyl acetonitrile,
chlorobenzthiazolyl acetonitrile,
benzthiazolyl ethyl acetate,
benzthiazolyl methyl acetate,
benzthiazolyl dibutyl acetamide,
2-cyanomethylene-3-methylbenzthiazole,
2-cyanomethylene-1,3,3-trimethylindoline,
5-chloro-2-cyanomethylene-1,3,3-trimethylindoline,
2-cyanomethylene-5-methoxy-1,3,3-trimethylindoline,
2-ethoxycarbonylmethylene-1,3,3-trimethylindoline,
2-ethoxycarbonylmethylene-5-chloro-1,3,3-trimethylindoline,
4-pyridylacetonitrile,
2-pyridylacetonitrile,
4-cyanomethylene-1-methylpyridine,
2-cyanomethylene-1-methylpyridine,
2-cyanomethylene-1-methyl-1,2-dihydroquinoline.

The cationic dyes of the formula (I) are obtained as salts of the acids of the alkanol esters or aralkanol esters R—X used for their manufacture, i.e. as salts of inorganic or organic acids. They are therefore primarily halides, such as chlorides, bromides or iodides, alkyl sulphates, for example methosulphates and ethosulphates, benzenesulphonates or p-toluenesulphonates. If desired, salts of other acids can also be obtained by double reaction in a suitable polar solvent, for example oxalates by adding oxalic acid. Double salts can also be obtained, for example with the dyestuff halides and corresponding zinc halides.

The precipitation of the dye salts can be brought to completion by adding sodium chloride and/or zinc chloride in an aqueous-acid solution, and they are thereafter isolated by filtration.

The dyes obtained according to the present invention are suitable for dyeing and printing material made from polyacrylonitrile or polyvinylidene cyanide and from other acid-modified synthetic fibers, such as acid-modified polyamide or acid modified polyesters.

The term "polyacrylonitrile" is to be understood as meaning primarily polymers which contain more than 85%, for example 85 to 100%, of acrylonitrile, and in addition contain from 0 to 15% of vinyl acetate, vinyl pyridine, vinyl chloride, vinylidene chloride, acrylic acid, acrylic esters, methacrylic acid, methylacrylic esters, etc.

The dyes of the present invention yield on these fibres, which can also be dyed in blends with each other, deep and level dyeings of good light-fastness and good general fastness properties, in particular good fastness to washing, sublimation, creasing, decatising, ironing, rubbing, carbonising, water, chlorinated water, sea-water, dry cleaning, cross-dyeing and solvents. These dyes also have good stability and good affinity, for example in aqueous solutions of different pH values.

The dyes of the present invention are suitable for very nearly all acrylic fibers currently being marketed. Examples of suitable acrylic fibers are the commercial products sold under the following registered tradenames: Acrilan, Creslan, Crylor, Courtelle, Dynel, Dolan, Euroacryl, Exalan, Orlon, Velicren, Vonnel, Verel, Wolcrylon and Zefran.

The dyes of this invention are also very suitable for trichromatic dyeings, since they can be readily combined with already known basic dyes.

The invention is illustrated by the following Examples in which the parts and percentages are by weight, unless otherwise indicated, and the relationship between parts by weight and parts by volume is the same as that between the gram and the cubic centimeter.

EXAMPLE 1

3.4 parts of 5-amino-3-methyl-1-phenylpyrazole are diazotised in the usual way and the diazo solution is added dropwise at 0° to 10° C to a solution of 3.1 parts of benzimidazolyl acetonitrile in 20 parts of glacial acetic acid. After brief stirring, the pH is adjusted to 2 with sodium acetate solution and the batch is stirred for 1 hour. The precipitated colour base is filtered off, washed with water and dried.

3.4 g of this colour base ae quaternised in 50 parts of chlorobenzene with 3.7 parts of dimethyl sulphate in the presence of 0.5 parts of magnesium oxide in the course of 2 hours at 115° to 120° C. The precipitated product is filtered off at 25° C, washed with chlorobenzene and dried, to yield 7.5 parts of the dye of the formula

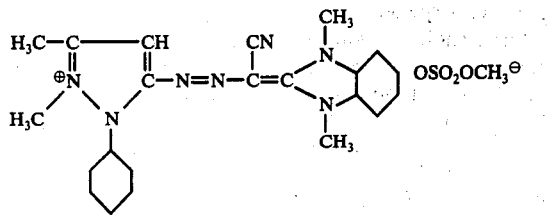

which dyes polyacrylonitrile in yellow shades with excellent fastness properties.

EXAMPLE 2

3.4 parts of 5-amino-3-methyl-1-phenylpyrazole are diazotised in the usual way and the diazo solution is added dropwise at 0° to 10° C to a solution of 4 parts of 1,3,3-trimethyl-2-cyanomethylene-indoline in 20 parts of 80% acetic acid. After brief stirring, ice is added and the pH is adjusted to app. 4 with sodium acetate. The precipitated colour base is filtered off, washed with water and dried.

1.9 parts of this colour base are quaternised at 100° C in chlorobenzene and 1.3 parts of dimethyl sulphate in the presence of 0.2 part of magnesium oxide. The precipitate which has formed is filtered off, washed with chlorobenzene and dried, to yield 2.5 parts of a dye of the formula

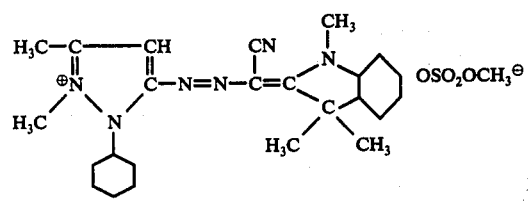

which dyes polyacrylonitrile in yellow shades with excellent fastness properties.

EXAMPLE 3 a. 3.4 parts of 5-amino-3-methyl-1-phenylpyrazole are diazotised in the usual way and the diazo solution is added dropwise at 0° to 10° C to a solution of 3.5 parts of benzthiazolyl acetonitrile in 30 parts of 80% acetic acid. After brief stirring, the colour base is precipitated by adding ice and neutralising with sodium hydroxide solution, then filtered off, washed with water and dried.

3.6 parts of this colour base are quaternised at 100° C in chlorobenzene with 3.1 parts of dimethyl sulphate in the presence of 0.6 part of magnesium oxide. The precipitate which has formed is filtered off, washed with chlorobenzene and dried, to yield 6.1 parts of a dye of the formula

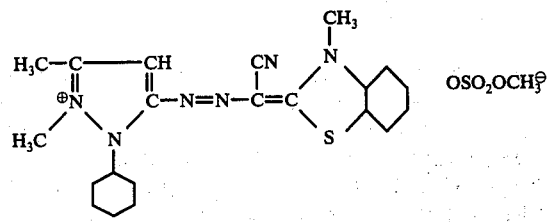

which dyes polyacrylonitrile in yellow shades with excellent fastness properties.

b. 5 parts of the above dried dye are processed to a printing paste together with 10 parts of thiodiglycol, 25 parts of 40% acetic acid, 225 parts of carob bean flour thickener (12% solution) and 235 parts of boiling water. A polyacrylonitrile fabric is printed with this paste and the print is finished in the manner employed in actual practice. A yellow print with good fastness properties is obtained.

c. 1 part of the dye obtained in (a) is dissolved in 5000 parts of water with the addition of 2 parts of 40% acetic acid and 100 parts of dried yarn made from polyacrylonitrile staple fibres are put into this dyebath at 60° C. The temperature is then raised to 100° C in the course of half an hour and dyeing is performed for 1 hour at boiling temperature. The dyed fabric is subsequently rinsed thoroughly and dried. A bright, yellow dyeing with good fastness properties is obtained.

d. A padding liquor is prepared from 40 parts of the dye obtained in (a), 40 parts of 80% acetic acid, 3 parts of carob bean flour thickener and 1000 parts of water. A polyacrylonitrile staple fibre fabric is put into this bath at 50° C and padded to a liquor pick-up of 100% and subsequently steamed at 100° C for 45 minutes in a continuous steamer. The fabric is then rinsed thoroughly and dried. A yellow dyeing with good fastness properties is obtained.

EXAMPLE 4

2.7 parts of 5-amino-3-methylpyrazole hydrochloride are diazotised and the diazo solution is added dropwise at 0° to 10° C to a solution of 4 parts of 1,3,3-trimethyl-2-cyanomethylene-indolinine in 50 parts of glacial acetic acid. The precipitated colour base is filtered off, washed with water and dried. 1.5 g of this colour base are quaternised at 100° C in chlorobenzene and 1.5 parts of this colour base are quaternised at 100° C in chlorobenzene and 1.5 parts of dimethyl sulphate in the presence of 0.3 part of magnesium oxide. The precipitate which has formed is filtered off, washed with chlorobenzene and dried, to yield 2.6 parts of a dye of the formula

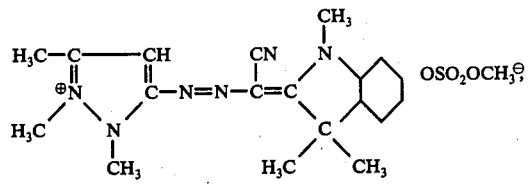

which dyes polyacrylonitrile in yellow shades with excellent fastness properties.

The dye salts of the formula

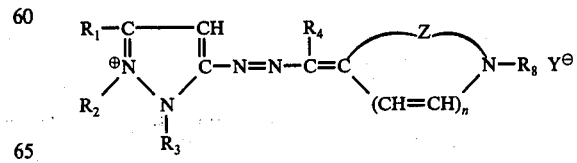

which are listed in Table 1 are obtained in analogous manner.

|  | R₁ | R₂ | R₃ | R₄ | n | Z | R₈ | Y⊖ | Colour on polyacrylonitrile |
|---|---|---|---|---|---|---|---|---|---|
| 1 | CH₃ | CH₃ | CH₃ | CN | O | 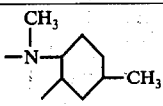 | CH₃ | OSO₂OCH₃ | yellow |
| 2 | " | " | " | " | " | 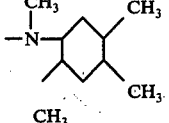 | " | " | " |
| 3 | " | " | " | " | " | 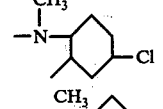 | " | " | " |
| 4 | " | " | Me,Ph | " | " | 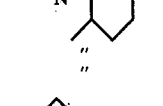 | " | Cl | " |
| 5 | " | " | " | COOC₂H₅ | " | " | " | OSO₂OCH₃ | " |
| 6 | " | " | " | CON(C₂H₅)₂ | " | " | " | " | " |
| 7 | " | " | " | CN | " | 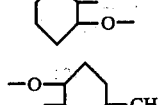 | " | " | " |
| 8 | " | " | " | " | " | 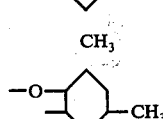 | " | " | " |
| 9 | " | " | " | " | " | 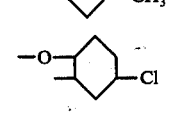 | " | " | " |
| 10 | " | " | " | " | " | 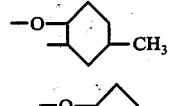 | " | " | " |
| 11 | " | " | " | " | " | 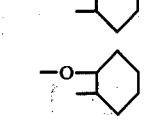 | " | Cl | " |
| 12 | " | " | " | COOC₂H₅ | " | 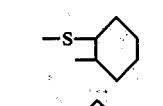 | " | OSO₂OCH₃ | " |
| 13 | " | " | " | CON(C₄H₉)₂ | " | 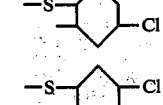 | " | " | " |
| 14 | " | " | CH₃ | CN | " | 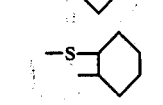 | " | " | " |
| 15 | " | " | Me,Ph | " | " | 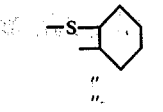 | " | " | " |
| 16 | " | " | C₆H₅ | CN | " | 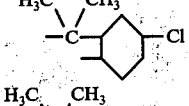 | " | " | " |
| 17 | " | " | " | COOC₆H₅ | " | 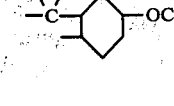 | " | " | " |
| 18 | " | " | " | CON(C₂H₅)₂ | " |  | " | " | " |
| 19 | " | " | " | CN | " | " | " | Cl | " |
| 20 | " | " | " | " | " | " | " | ZnCl₃ | " |
| 21 | " | " | Me,Ph | " | " |  | " | OSO₂OCH₃ | " |
| 22 | " | " | " | " | " |  | " | " | " |

-continued

| | $R_1$ | $R_2$ | $R_3$ | $R_4$ | n | Z | $R_8$ | $Y^\ominus$ | Colour on polyacrylonitrile |
|---|---|---|---|---|---|---|---|---|---|
| 23 | " | " | " | " | " | H₃C, CH₃ >C< cyclohexyl | " | Cl | " |
| 24 | " | " | " | " | " | " | " | ZnCl₃ | " |
| 25 | " | " | " | COOC₂H₅ | " | " | " | OSO₂OCH₃ | yellowish brown |
| 26 | " | " | " | " | " | H₃C, CH₃ >C< cyclohexyl-Cl | " | " | " |
| 27 | " | C₆H₅CH₂ | C₆H₅ | CN | " | H₃C, CH₃ >C< cyclohexyl | " | Br | yellow |
| 28 | " | C₆H₅ | " | " | " | " | " | OSO₂OCH₃ | " |
| 29 | " | C₂H₄CN | " | " | " | " | " | Cl | " |
| 30 | " | C₂H₄OH | " | " | " | " | " | " | " |
| 31 | " | CH₃ | p-ClC₆H₄ | " | " | " | " | OSO₂OCH₃ | " |
| 32 | " | " | " | " | " | —S—cyclopentyl | " | " | " |
| 33 | " | " | " | " | " | —O—cyclopentyl | " | " | " |
| 34 | " | " | " | " | " | CH₃ / —N—cyclopentyl | " | " | " |
| 35 | C₆H₅ | " | CH₃ | " | " | " | " | " | " |
| 36 | " | " | " | " | " | " | " | " | " |
| 37 | " | " | " | " | " | —O—cyclopentyl | " | " | " |
| 38 | " | " | " | " | " | —S—cyclopentyl H₃C, CH₃ >C< | " | " | " |
| 39 | " | " | C₆H₅ | " | " | " | " | " | " |
| 40 | " | " | " | " | " | " | " | " | " |
| 41 | CH₃ | " | C₂H₅ | " | " | —S—cyclopentyl CH₃ / —N— | " | " | " |
| 42 | " | " | CH₃ | " | " | " | " | " | " |
| 43 | " | " | C₆H₅ | " | " | —(CH=CH)₂— | " | " | " |
| 44 | " | " | " | " | 1 | —CH=CH— | " | " | " |
| 45 | " | C₆H₅CH₂ | CH₃ | " | 0 | —(CH=CH)₂— | " | Br | " |
| 46 | " | " | " | " | 1 | —CH=CH— | " | " | " |
| 47 | C₆H₅ | CH₃ | CH₃ | CN | 0 | —(CH=CH)₂— | CH₃ | OSO₂OCH₃ | yellow |
| 48 | " | " | " | " | 1 | —CH=CH— | " | " | " |
| 49 | CH₃ | CH₃ | C₆H₅ | " | 0 | CH₃ \ CH / cyclohexyl | " | Cl | orange |

Where the symbols "Ph,Me" appear in the R₃ column, they denote that both the methyl and the phenyl derivative were manufactured. In every case these derivatives yielded yellow shades on polyacrylonitrile fibres.

EXAMPLE 5

3.7 parts of 5-amino-3,4-dimethyl-1-phenylpyrazole are diazotised in the usual way and the diazo solution is added dropwise at 0° to 10° C to a solution of 3.5 parts of benzthiazolyl aceonitrile in 30 parts of 80% acetic acid. After brief stirring, the colour base is precipitated by adding ice and neutralising with sodium hydroxide solution, filtered off, washed with water and dried.

3.7 g of this colour base are quaternised at 100° C in chlorobenzene with 3.1 parts of dimethyl sulphate in the presence of 0.6 part of magnesium oxide. The precipitate which has formed is filtered off, washed with chlorobenzene and dried, to yield 6.3 parts of a dye of the formula

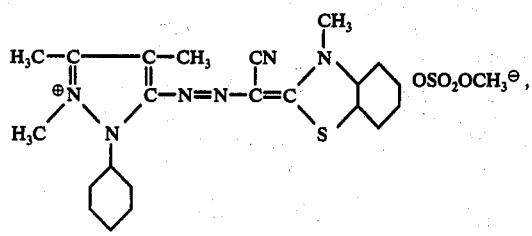

which dyes polyacrylonitrile in yellow shades with excellent fastness properties.

The dye salts of the formula

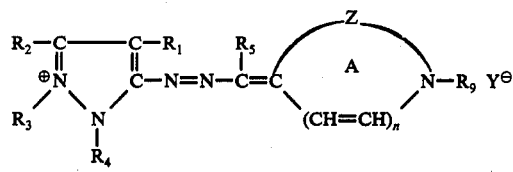

listed in Table 2 are obtained in analogous manner.

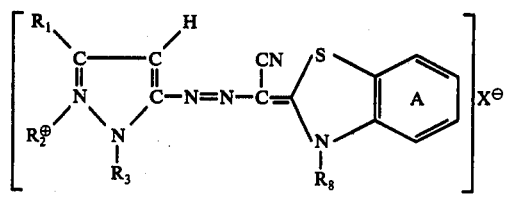

wherein $R_1$ is $C_1$–$C_4$ alkyl; $C_1$–$C_4$ alkyl substituted by $C_1$–$C_4$-alkoxy, bromo, chloro, phenyl, hydroxy, cyano, —$CONH_2$, N-lower alkyl carboxamide, N,N-dilower alkyl carboxamide, or lower alkoxycarbonyl; phenyl; or phenyl substituted by chloro, bromo, nitro, cyano, lower alkyl, lower alkoxy, lower alkylcarbonylamino, lower alkoxycarbonyl lower alkylaminocarbonyl or trifluoromethyl;

$R_2$ is $C_1$–$C_5$ alkyl; $C_1$–$C_5$ alkyl substituted by $C_1$–$C_4$ alkoxy, bromo, chloro, phenyl, hydroxy, cyano, —$CONH_2$, N-lower alkyl carboxamide, N,N-dilower alkylcarboxamide or lower alkoxycarbonyl; benzyl; or benzyl substituted by lower alk-

| | $R_1$ | $R_2$ | $R_3$ | $R_4$ | $R_5$ | n | A | $R_9$ | $Y^\ominus$ | Colour on polyacrylonitrile |
|---|---|---|---|---|---|---|---|---|---|---|
| 1 | $CH_3$ | $CH_3$ | $CH_3$ | Me,Ph | CN | 0 | $H_3C$ $CH_2$ ring | $CH_3$ | $OSO_2OCH_3$ | yellow |
| 2 | " | " | " | " | " | " | —S— ring | " | " | " |
| 3 | " | " | " | " | " | " | —O— ring with $CH_3$ | " | " | " |
| 4 | " | " | " | " | " | " | —N($CH_3$)— ring | " | " | " |
| 5 | $C_6H_5$ | " | " | $C_6H_5$ | " | " | —S— ring | " | " | " |
| 6 | " | " | " | " | " | " | $H_3C$ $CH_3$ ring | " | " | " |
| 7 | $CH_3$ | " | " | " | $COOC_2H_5$ | " | " | " | " | " |
| 8 | " | " | " | " | " | " | —S— ring | " | " | " |
| 9 | $C_6H_5$ | " | " | " | $CON(CH_3)_2$ | " | " | " | " | " |
| 10 | " | " | " | " | " | " | $H_3C$ $CH_3$ ring | " | " | " |

Where the symbols "Ph,Me" appear in the $R_4$ column, they denote that both the methyl and phenyl derivative were manufactured. In every case these derivatives yielded yellow shades on polyacrylonitrile fibres.

We claim:

1. A cationic dyestuff of the formula oxy, lower alkyl, nitro, chloro, bromo or lower alkoxycarbonyl;

$R_3$ is $C_1$-$C_5$ alkyl, $C_1$-$C_5$ alkyl substituted by $C_1$-$C_4$ alkoxy, bromo, chloro, phenyl, hydroxy, cyano, —$CONH_2$, N-lower alkyl carboxamide, N,N-dilower alkyl carboxamide or lower alkoxycarbonyl; phenyl; phenyl substituted by chloro, bromo, nitro, cyano, lower alkyl, lower alkoxy, lower alkylcarbonylamino, lower alkoxycarbonyl, lower alkylaminocarbonyl, or trifluoromethyl; or benzyl substituted by lower alkoxy, lower alkyl, nitro, chloro, bromo, or lower alkoxycarbonyl;

$R_8$ is $C_1$-$C_5$-alkyl, $C_1$-$C_5$-alkyl substituted by $C_1$-$C_4$-alkoxy, bromo, chloro, phenyl, hydroxy, cyano, —$CONH_2$, N-lower alkyl carboxamide, N,N-dilower alkyl carboxamide; or benzyl substituted by lower alkoxy, lower alkyl, nitro, chloro, bromo or lower alkoxycarbonyl;

the benzo ring A is unsubstituted or substituted by alkyl of 1–4 carbon atoms, chloro, bromo, nitro, cyano, carboalkoxy of 1–4 carbon atoms, aminosulfonyl or alkoxy of 1 to 4 carbon atoms; and X is an anion.

* * * * *